(No Model.) 4 Sheets—Sheet 1.
J. J. WOOD.
ALTERNATING CURRENT DYNAMO ELECTRIC MACHINE.
No. 491,695. Patented Feb. 14, 1893.
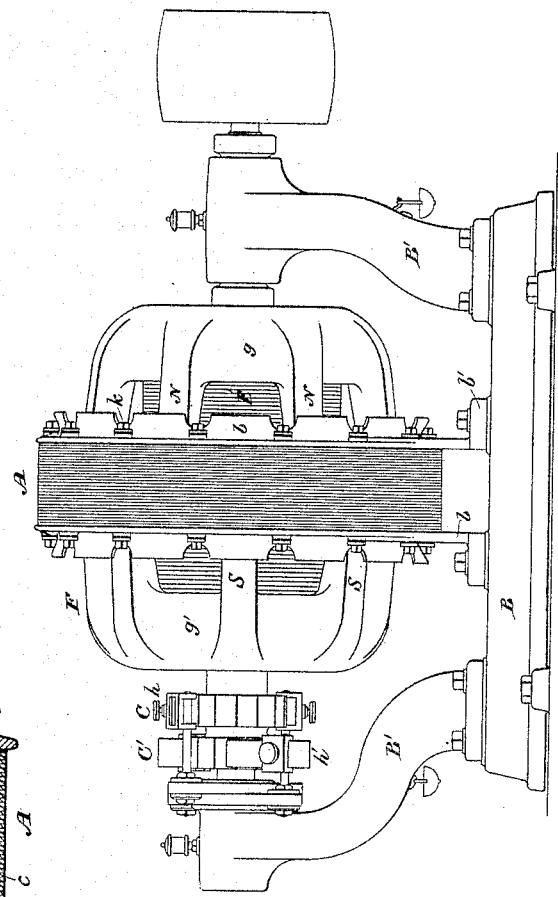
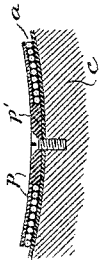
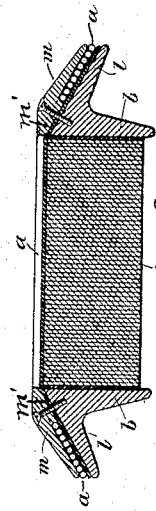
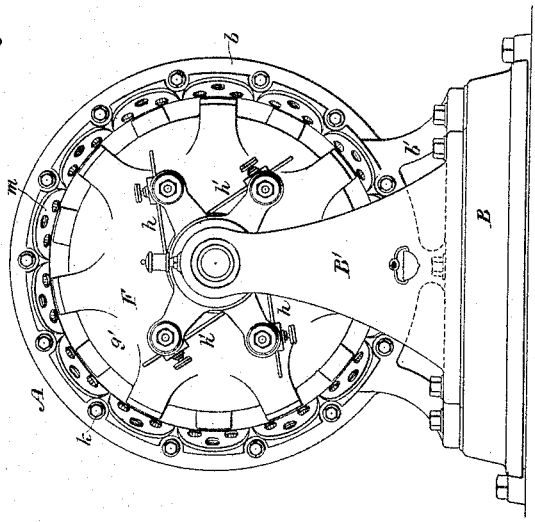
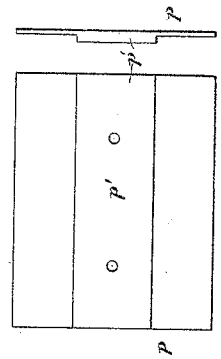
WITNESSES:
Geo. W. Breck.
Henry W. Lloyd.
INVENTOR:
James J. Wood,
By his Attorneys,
Arthur C. Fraser & Co.,
THE NORRIS PETERS CO., PHOTO-LITHO., WASHINGTON, D. C.

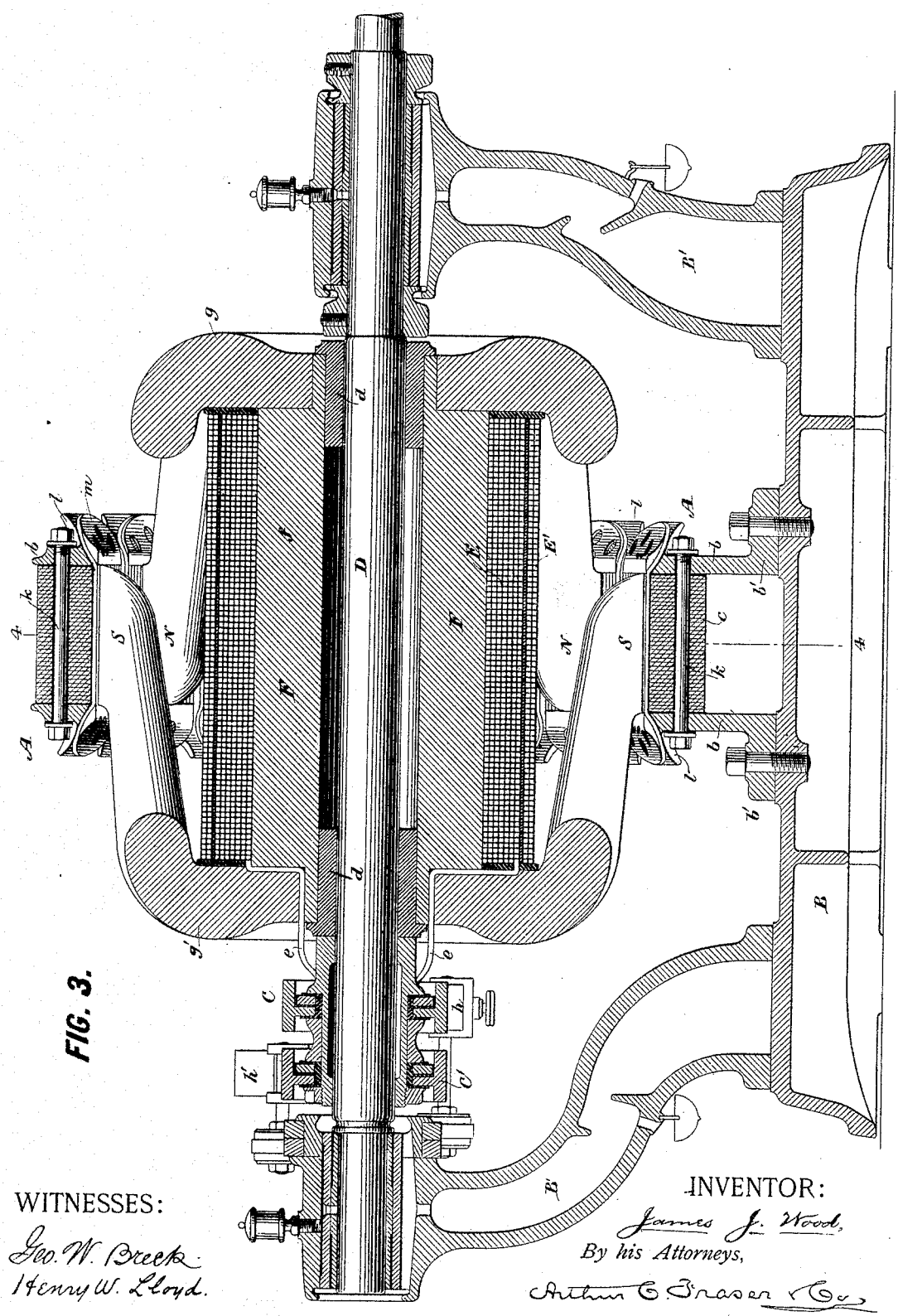

(No Model.) 4 Sheets—Sheet 3.

J. J. WOOD.
ALTERNATING CURRENT DYNAMO ELECTRIC MACHINE.

No. 491,695. Patented Feb. 14, 1893.

WITNESSES:
Geo. W. Breck
Henry W. Lloyd.

INVENTOR:
James J. Wood,
By his Attorneys,
Arthur C. Fraser & Co.

(No Model.)
4 Sheets—Sheet 4.
J. J. WOOD.
ALTERNATING CURRENT DYNAMO ELECTRIC MACHINE.
No. 491,695.          Patented Feb. 14, 1893.
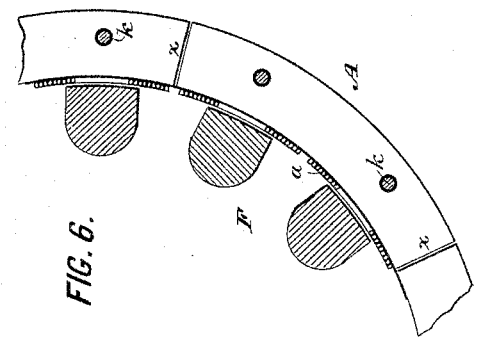
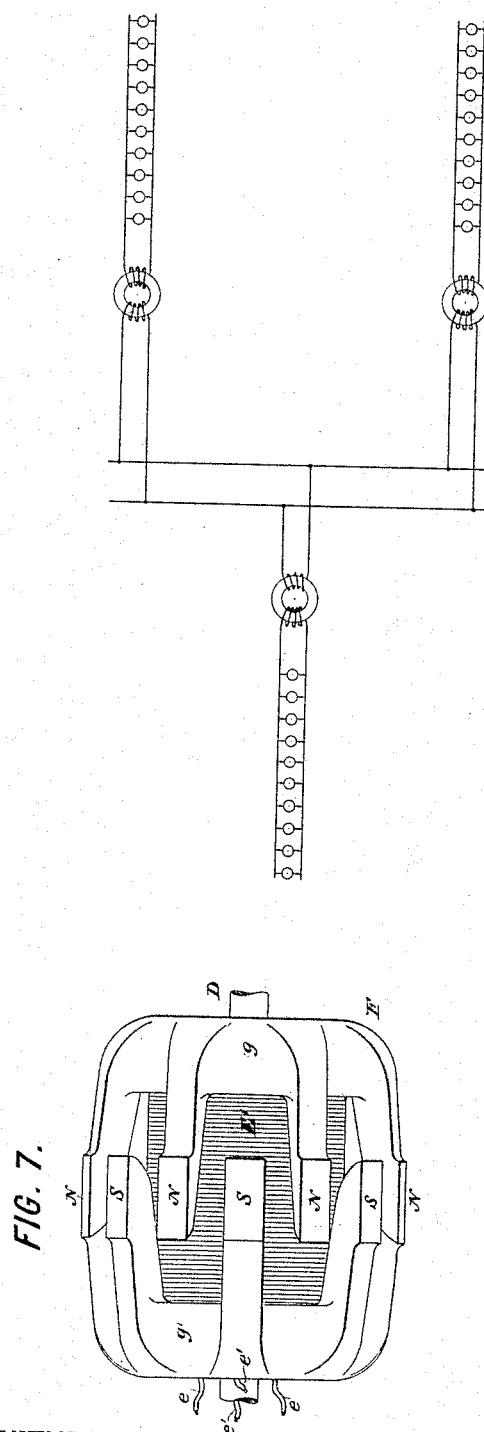
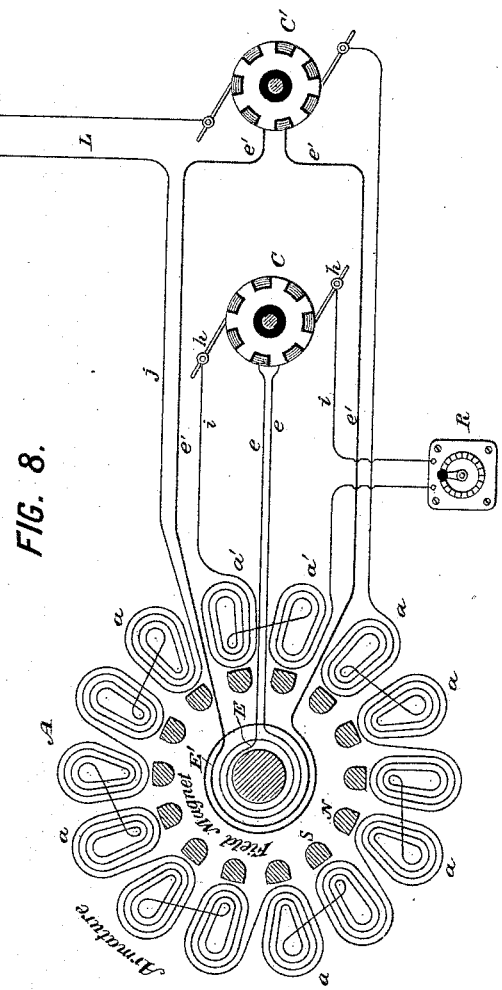
WITNESSES:
Geo. W. Breck.
Henry W. Lloyd.
INVENTOR:
James J. Wood,
By his Attorneys,
Arthur C. Fraser & Co.

UNITED STATES PATENT OFFICE.

JAMES J. WOOD, OF BROOKLYN, NEW YORK.

ALTERNATING-CURRENT DYNAMO-ELECTRIC MACHINE.

SPECIFICATION forming part of Letters Patent No. 491,695, dated February 14, 1893.

Application filed October 30, 1890. Serial No. 369,823. (No model.)

*To all whom it may concern:*

Be it known that I, JAMES J. WOOD, a citizen of the United States, residing in Brooklyn, in the county of Kings and State of New York, have invented certain new and useful Improvements in Alternating-Current Dynamos, of which the following is a specification.

This invention relates to dynamo electric machines for generating an alternating current. It is also applicable to machines for generating a pulsating current of uniform direction.

My improved machine belongs to that class of alternating dynamos in which the armature is a stationary ring and the field magnet revolves. The field magnet is constructed of an axial core around which the exciting coil which revolves with the field magnet is wound, and polar arms extending from the opposite ends of the core and passing backwardly toward and beyond the middle thereof on the exterior of the coil. The arms branching from one end are of north and those from the other end of south polarity, and they pass between each other around the middle of the core so that each polar arm terminates between the arms of the opposite polarity. The polar arms are formed with outwardly turned faces in the same planes and constitute segments preferably of a cylinder. The armature is in the form of a ring having preferably a cylindrical inner surface and which surrounds the polar ends of the arms so that the latter revolve within it. The armature consists of an annular core, preferably laminated, with a succession of flat coils laid against its inner surface. My invention introduces several improvements in the construction of dynamos of this general character, as will be hereinafter specified.

Figure 5:
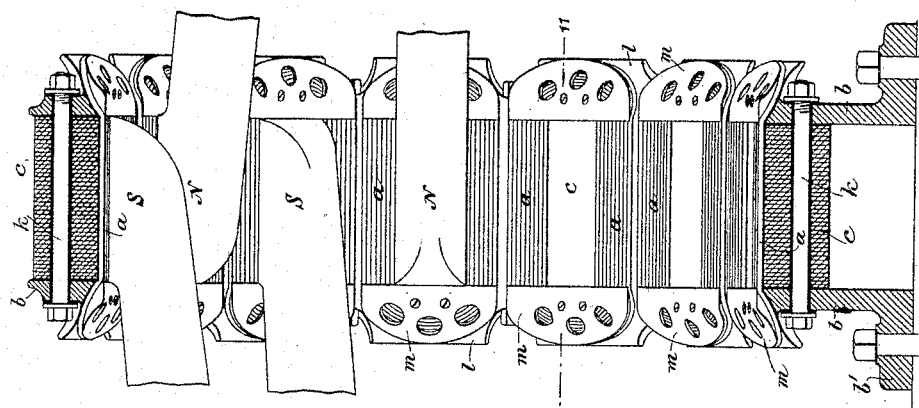
Figure 12:
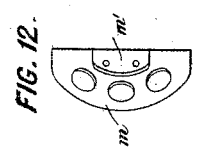
Figure 4:
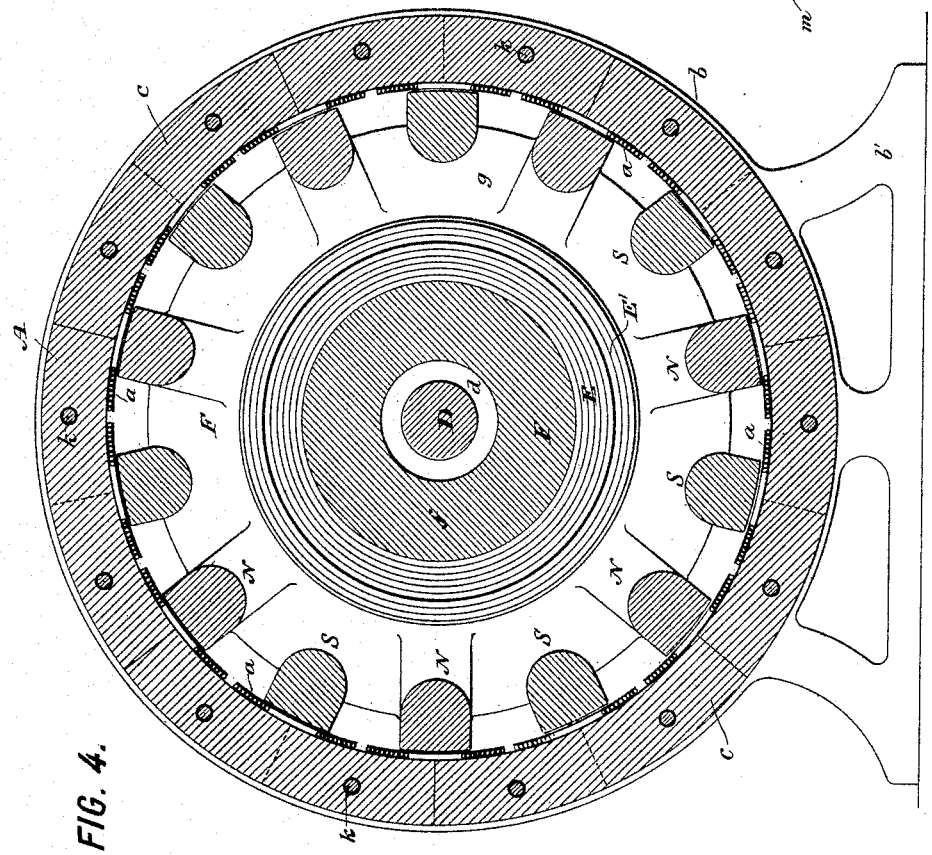

Figure 1 of the accompanying drawings is a front elevation, and Fig. 2 a side elevation of my improved dynamo; Fig. 3 is a vertical longitudinal mid-section thereof; Fig. 4 is a vertical transverse mid-section thereof in the plane of the line 4—4 in Fig. 3; Fig. 5 is a vertical transverse mid-section of the armature showing some of the polar arms and the field magnet, but others thereof being omitted in order to show the inner surface of the armature more clearly; Fig. 6 shows a fragment of Fig. 4 illustrating a slightly modified construction; Fig. 7 is a side elevation of the field magnet removed; Fig. 8 is a diagram showing the circuit connections; Fig. 9 is an outer side and end view of one of the insulating plates of the armature, and Fig. 10 is a fragmentary section in the same plane as Fig. 4, showing the construction and fastening of one of the armature coils in detail. Fig. 11 is a transverse section of the armature on a larger scale on line 11—11 in Fig. 5. Fig. 12 is an outer side view of one of the armature coil fastening plates.

Let F designate the field magnet, A the armature, $a\,a\,a'$ the armature coils E E', the exciting coils of the field magnet, C C' current rectifying commutators in connection with these coils, and L the line circuit.

The entire machine is placed upon a base B of any suitable construction, on which the armature A is directly mounted and fastened. This armature consists generally of an annular core $c$, preferably laminated, clamped between annular frames $b\,b$ having feet $b'$ which rest on and are bolted to the standard B. The armature coils $a\,a\,a'$ are flat coils preferably of one depth of wire such as are usually used for alternating dynamos and which are fastened against the inner surface of the armature core. The successive coils are connected together serially after the manner shown in Fig. 8.

The field magnet F is mounted on the rotative shaft D of the dynamo, which shaft turns in bearings formed on brackets B' B' which are fastened to the base B. The field magnet is constructed with an iron core $f$ of tubular form through which the shaft D passes and from which it is magnetically separated by sleeves $d\,d$ of gun metal or other non-magnetizable material. Against the opposite ends of this core are placed iron caps or disks $g\,g'$, which are formed respectively with polar arms N N and S S branching from them in direction toward the middle of the core $f$. The arms N N, of north polarity, branch from one of the disks, and the arms S S, of south polarity, from the other. The arms of the two disks are of equal number and are uniformly spaced, so that when the two disks are applied, those of one disk are alternated with those of the other forming polar ends projecting between the polar ends of the other with equal intervening spaces. The arms are turned slightly outward at their ends to form outwardly turned polar faces. These faces are finished preferably as segments of a cylinder of such diameter as to fit freely within the armature so that the field magnet may be freely rotated therein. The field magnet is wound with exciting coils E E', which are applied around the exterior of the core $f$ and within the polar arms N S. These coils receive continuous or pulsating currents of uniform direction from any suitable source. The effect of the current in these coils is to magnetize the field magnet, imparting to one of the disks $g$ or $g'$ and its polar arms a north polarity, and to the other disk and arms a south polarity. The field magnet being in place within the armature, the polar faces of its arms N S revolve closely adjacent to the flat coils thereof. These field magnet poles are of a number corresponding to the number of armature coils, being preferably equal in number thereto. Thus with fourteen armature coils as shown, there will be seven north and seven south poles. The preferable radial divisions or relative widths of the poles, their intervening spaces, and the armature coils, are as shown in Fig. 4. As the field magnet is revolved, the poles thereof in sweeping past the flat armature coils, generate alternating currents therein in the manner well understood.

The terminals of the exciting coils E E' are carried out through one end of the field magnet preferably in grooves between the disk $g'$ and core $f$ as shown by the wires $e\ e$ in Fig. 3, and the wires $e\ e'$ in Fig. 7. The terminals $e\ e$ of the main exciting coil E are connected with the respective segments of a two-part commutator C, as clearly shown in the diagram Fig. 8. The terminals $e'\ e'$ of the supplemental coil E' (shown heavier in Fig. 8 for the sake of distinction) are connected with the respective segments of a two-part commutator C'. The brushes $h\ h$ of the commutator C are connected by wires $i\ i$ with one, two or more of the armature coils, these coils being lettered $a'$. Two coils are shown so connected in Fig. 8. The circuit $i$ also includes a rheostat R by which its resistance may be varied at will. The coils $a'\ a'$ are thus included in a circuit with the main exciting coil E through the medium of rectifying commutator C, which converts the alternating currents generated in them to pulsatory currents in the exciting coil. These armature coils serve the sole purpose of imparting to the field magnet a uniform excitation sufficient to enable it to induce in the armature the minimum current which the machine generates, or in other words, to enable the dynamo to maintain the required difference of potentials under no load. The function of these coils is thus to overcome the magnetic resistance of the field magnet. The remaining coils $a\ a$, of the armature are connected in series, one terminal of the series passing directly to line, and the other terminal passing to line through the commutator C', and consequently traversing in the form of a rectified or pulsatory current the supplemental coil E'. The current in this coil consequently varies to the same extent as the variations in the line current, so that as the load is increased, this coil serves to build up the magnetization of the field magnet sufficiently to give it enough greater inductive capacity to generate the increased current required at the same difference of potentials.

The connections between the armature coils may be conveniently made against the exterior of one of the rings $b$ thereof. These connections are thus so located that they are readily accessible in case of necessity, but are not so exposed as to be liable to impart a shock to those working around the dynamo. The brushes of the commutators exhibit differences of potential corresponding only to the resistances of the respective exciting coils E and E', which are insufficient to give a dangerous shock in case the brushes are handled. The terminal wire $j$ of the armature coils $a\ a$, which leads directly to line, can be readily conducted away through the base of the dynamo in such manner that it will be impossible for any person to handle this terminal in connection with the brushes of the commutator C', so that it is impossible for any one to receive a shock due to the difference of potentials between the opposite terminals of the entire series of armature coils $a\ a$. By reason of the armature being stationary, the necessity of collectors with brushes for carrying off the current from the armature is avoided, which collectors exhibiting at their brushes the extreme difference of potentials generated by the dynamo, are a very dangerous feature of most alternating dynamos. The machine is consequently very safe to operate, the features of danger found in most alternating machines being eliminated.

The construction of the armature presents some novel features. The laminated core is clamped between the rings $b\ b$, which may be made of iron, but are preferably of gun metal or other non-magnetizable material, by insulated bolts $k\ k$ at intervals. The rings $b\ b$ are formed with flaring flanges $l\ l$ on their opposite sides extending outwardly in approximately conical direction, as best shown in Fig. 11. The ends of the armature coils are bent outwardly and laid flat against these flanges as shown in Fig. 11, and are confined by fastening over each a retaining plate or cap $m$ having on its side against the flange a boss $m'$ which enters within the coil, and between which and a like boss on the plate at the other side, the coil is stretched. These plates are preferably fastened by screws passing through the bosses into the rings $b$. They are preferably pierced with holes to afford ventilation.

In order to hold the parallel portions of the armature coils in position and prevent their distortion by the magnetic strain, plates $p$ of insulating material, one of which is shown separately in Fig. 9, are fastened against them as shown in Fig. 10. These are omitted in the other figures for the sake of clearness. Each plate $p$ has its middle portion $p'$ thickened within the coil, and is fastened by screws passing through this thickened portion into the core $c$. These plates $p$ are sufficiently strong to hold the flat coils in place against the magnetic strain of the lines of force from the poles. Other means, however, may be provided for accomplishing this purpose, such as a flat ring expanded within the armature core.

The lamination of the armature core is preferably effected by cutting thin sheets or plates into segmental rings as shown in Fig. 4, instead of complete rings, and fitting these segments together so as to overlap or break joints, as shown by comparison of the full and dotted lines crossing the core in Fig. 4. Thus an important saving of material is effected as compared with cutting complete rings from sheet metal. The bolts $k$ $k$ engaging the overlapped segments of rings, hold the mass thereof so intimately together that they meet as closely and to the same magnetic effect as though the rings were complete. I prefer, however, a more complete subdivision of the armature core into segments in the manner shown in Fig. 6, which illustrates the subdivision of the armature core radially into as many equal segments as there are pairs of armature coils, or in other words, into the same number of segments as the number of polar arms of like polarity, that is, seven in the particular construction shown. These radial subdivisions, shown at $x$ $x$ in Fig. 6, serve to prevent the circulation of eddy currents around the armature core, these currents being thereby confined to the separate segments of the core, and so greatly reduced as to have little or no deleterious effect. The segments should be so separated at the divisions $x$, by being slightly spaced apart or by insulating material, as to afford sufficient resistance to prevent the passage of these eddy currents. The supporting rings $b$ $b$ are made complete, and so that they bridge these spaces and serve to strongly hold the sections of the armature core in proper relative positions.

In order to prevent any leakage of lines of magnetic force through the shaft D, bearing frames B', and base B, thereby forming a magnetic short-circuit, I construct one of the frames B' of non-magnetizable metal, such as gun-metal, to form a sufficiently wide break in this possible magnetic circuit. This might not always be necessary, however, as the break afforded through the bushings $d$ $d$ may be sufficient. Formation of such a magnetic short-circuit might otherwise be prevented by making the shaft of some non-magnetizable metal.

The construction of the field magnet with a tubular core $f$ is not essential, as this core might be made solid and its ends prolonged to form journals in place of the shaft, or in other words; the shaft D might be made to serve as the core of the field magnet by making its middle portion of iron and of sufficient diameter.

It must not be inferred from the minuteness of detail with which I have described my improved dynamo that my invention is necessarily limited to these details of construction.

Instead of imparting the initial excitation to the field magnet by a current from two of the armature coils $a'$ $a'$, this current might be derived from a separate exciter, as is common. The coil E' may be omitted. Or if used, it may be supplied with a current from a separate exciter, the current from which may be varied as the output of the dynamo demands.

It will be understood that my dynamo is equally applicable to generate alternating or pulsating currents. If pulsating currents are desired, it will only be necessary to pass the current through a rectifying commutator before throwing it onto the line in a manner well understood by electricians.

I claim as my invention the following defined novel features substantially as hereinbefore specified, namely:—

1. An armature consisting of an annular core of magnetizable metal, devoid of polar projections two supporting rings fastened against its opposite sides, and a succession of flat coils arranged against the inner surface of the core crossing it from side to side and having their curved end portions bent outwardly and fastened against the supporting rings.

2. An armature consisting of an annular core of magnetizable metal, two supporting rings fastened against its opposite sides and having conical or flaring flanges projecting from the inner surface of the core, with a succession of flat coils arranged against the inner surface of the core crossing it from side to side and having their curved end portions bent outwardly and fastened against the flanges of said rings.

3. An armature consisting of an annular core of magnetizable metal, two supporting rings fastened against its opposite sides having flaring flanges projecting from the inner surface of the core, of a succession of flat coils arranged against the inner surface of the core crossing it from side to side with their curved end portions bent outwardly against said flanges, and fastening plates overlying said end portions and fastened to the rings.

4. An armature consisting of an annular core of magnetizable metal having an approximately cylindrical inner surface, two supporting rings fastened against opposite sides of the core, a succession of flat coils arranged against its inner surface crossing it from side to side, and fastening plates for retaining said coils in place against the core, having each a thickened portion entering the open center of the coil and fastened against the core, and thinner portions or wings overlying the wires of the coil and holding them flat against the core.

In witness whereof I have hereunto signed my name in the presence of two subscribing witnesses.

JAMES J. WOOD.

Witnesses:
ARTHUR C. FRASER,
GEORGE H. FRASER.